(12) United States Patent
Kamigaichi

(10) Patent No.: US 9,203,221 B2
(45) Date of Patent: Dec. 1, 2015

(54) STORING BOX AND ELECTRICAL JUNCTION BOX

(71) Applicant: Yazaki Corporation, Minato-ku, Tokyo (JP)

(72) Inventor: Shungo Kamigaichi, Hiroshima (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 15 days.

(21) Appl. No.: 14/036,234

(22) Filed: Sep. 25, 2013

(65) Prior Publication Data

US 2014/0020948 A1    Jan. 23, 2014

Related U.S. Application Data

(63) Continuation of application No. PCT/JP2012/057623, filed on Mar. 23, 2012.

(30) Foreign Application Priority Data

Mar. 25, 2011    (JP) ................................. 2011-068351

(51) Int. Cl.
*H02G 3/08* (2006.01)
*B60R 16/023* (2006.01)
*H02G 3/16* (2006.01)

(52) U.S. Cl.
CPC .............. *H02G 3/08* (2013.01); *B60R 16/0239* (2013.01); *H02G 3/086* (2013.01); *H02G 3/16* (2013.01)

(58) Field of Classification Search
CPC ........... H02G 3/08; H02G 3/081; H02G 3/26; H02G 3/30; H02G 3/36; H02G 3/16; H02G 3/086; H05K 5/00; H05K 5/02; H05K 5/0204; H05K 5/0247; H05K 7/00; B60R 16/00; B60R 16/02; B60R 16/0239
USPC ......... 174/50, 53, 57, 58, 561, 535, 559, 520; 220/3.2–3.9, 4.02; 439/76.1, 76.2, 460
See application file for complete search history.

(56) References Cited

U.S. PATENT DOCUMENTS

| 5,699,221 | A  |   | 12/1997 | O'Leary et al. |
| 6,045,394 | A  |   | 4/2000  | Matsuoka et al. |
| 6,322,376 | B1 | * | 11/2001 | Jetton .......................... 439/76.2 |
| 6,462,270 | B1 | * | 10/2002 | Depp et al. ...................... 174/50 |

(Continued)

FOREIGN PATENT DOCUMENTS

| CN | 1196591 A   | 10/1998 |
| CN | 101494364 A | 7/2009  |

(Continued)

OTHER PUBLICATIONS

Nov. 12, 2014—(EP) Extended Search Report—App 12764805.3.

(Continued)

*Primary Examiner* — Angel R Estrada
(74) *Attorney, Agent, or Firm* — Banner & Witcoff, Ltd.

(57) ABSTRACT

A storing box is formed with a unit storing room storing an electronic control unit. The storing box is formed with a latching part by which an electric wire or a connector connected to one end of the electric wire is caught. The electric wire passes through an inner side of the unit storing room and is drawn out from a storing opening which is an entrance for storing the electronic control unit.

8 Claims, 13 Drawing Sheets

(56) References Cited

U.S. PATENT DOCUMENTS

| | | | |
|---|---|---|---|
| 7,586,038 B2* | 9/2009 | Kanamaru et al. | 174/50 |
| 7,771,226 B2* | 8/2010 | Iwaasa | 439/460 |
| 7,780,459 B2* | 8/2010 | Yamamoto et al. | 439/76.2 |
| 7,934,934 B2* | 5/2011 | Taniguchi et al. | 439/76.1 |
| 8,729,409 B2* | 5/2014 | Takeuchi et al. | 174/50 |
| 8,907,213 B2* | 12/2014 | I et al. | 174/50 |
| 2007/0249189 A1 | 10/2007 | Kaneko et al. | |
| 2009/0096132 A1 | 4/2009 | Yamamoto | |

FOREIGN PATENT DOCUMENTS

| | | |
|---|---|---|
| JP | 09-051624 A | 2/1997 |
| JP | 2000-358312 A | 12/2000 |
| JP | 2002-337628 A | 11/2002 |
| JP | 2006-036155 A | 2/2006 |
| JP | 2006-036155 A | 2/2006 |
| JP | 2006-311700 A | 11/2006 |
| JP | 2009-100533 A | 5/2009 |
| JP | 2009-201292 A | 9/2009 |

OTHER PUBLICATIONS

English translation of the Written Opinion issued in PCT/JP2012/057623 mailed on May 22, 2012.
International Search Report issued in corresponding International Application No. PCT/JP2012/057623 mailed May 22, 2012.
European Search Report dated May 30, 2014, issued for the European patent application No. 14153911.4.
Oct. 10, 2015—(CN) Notification of the First Office Action—App 201280014948.1.

* cited by examiner

STORING BOX AND ELECTRICAL JUNCTION BOX

CROSS REFERENCE TO RELATED APPLICATIONS

This application is a continuation of PCT application No. PCT/JP2012/057623, which was filed on Mar. 23, 2012 based on Japanese Patent Application (No. 2011-068351) filed on Mar. 25, 2011, the contents of which are incorporated herein by reference.

BACKGROUND OF THE INVENTION

1. Technical Field

The present invention relates to a storing box and an electrical junction box which are carried in an automobile or the like, and which include a unit storing room to store an electronic control unit.

2. Background Art

Traditionally, a type of electrical junction box which has a unit storing room that receives an electronic control unit including electrical control components is proposed (refer to a patent document 1). The electrical junction box has a unit storing room which accommodates the electronic control unit and a storing room which accommodates a plurality of electric wires (harness) and connectors which are connected to the electronic control unit. The electrical junction box packs up these components compactly and is installed in a vehicle indoor room. When the electronic control unit is to be accommodated in the unit storing room, the electrical junction box in which the electric wires, connectors and the like are arranged in advance is prepared by the electrical manufacturer or the electric wire arranging dealer, and then, the electronic control unit is accommodated in the unit storing room of the electrical junction box by the automobile manufacturer.

CITATION LIST

Patent Documents

Patent document 1: JP-A-2009-100533

SUMMARY OF INVENTION

The traditional electrical junction box has the following problems to be solved. That is, the operation, which is performed by the automobile manufacturer or the like, of connecting the prepared electronic control unit to the connectors at the ends of the electric wires which are arranged in the unit storing room of the electrical junction box, and storing the electronic control unit in the unit storing room is extremely troublesome. For example, an operator puts one hand into the unit storing room to grasp with fingers the plurality of electric wires and the connectors at the ends of the electric wires which are arranged near the bottom part of the unit storing room, and lifts above the opening part of the unit storing room. The connectors at the ends of the electric wires, which are held in this way, are connected (fitted) respectively to the plurality of terminals at the back surface of the electronic control unit supported by another hand. In this case, a force to draw the electric wires and the connectors back into the unit storing room is applied to the electric wires and the connectors. Therefore, as the hand which supports the relatively heavy electronic control unit shivers, it is difficult to perform the operation of connecting the connectors and the terminals smoothly, and the workload of the operator becomes heavier.

The present invention is made in view of the above situation, and an object of the invention is to provide a storing box and an electrical junction box so that in the operation of connecting connectors to an electronic control unit, the connectors can be easily and quickly connected (fitted) to the terminals of the electronic control unit and the workload of an operator can be substantially reduced.

To achieve the previously described object, the storing box according to the present invention is characterized by the following (1) to (7).

(1) A storing box formed with a unit storing room storing an electronic control unit, wherein
the storing box is formed with a latching part by which an electric wire or a connector connected to one end of the electric wire is caught, and the electric wire passes through an inner side of the unit storing room and is drawn out from a storing opening which is an entrance for storing the electronic control unit.

(2) The storing box according to the above (1), wherein
the latching part is formed at a side wall which defines the unit storing room.

(3) The storing box according to the above (1), wherein
the latching part is formed at a peripheral member which surrounds the unit storing room.

(4) The storing box according to the above (2), wherein
the latching part is formed on an outer side surface of the side wall which defines the unit storing room.

(5) The storing box according to the above (4), wherein
the latching part is a projection protruded outwards from the side wall which defines the unit storing room.

(6) The storing box according to the above (5), wherein
part of a band bundling the electric wire is caught by the projection.

An electrical junction box according to the present invention is characterized by the following (7).

(7) The storing box according to any one of the above (1) to (6) is provided.

According to the storing box which has the construction in the above (1), when the connectors are fitted in the electronic control unit, since the electric wires and the connectors can be easily held by hand, the workload is reduced.

According to the storing box which has the construction in the above (2), since the distance between the unit storing room and the connectors is decreased, the workload is reduced.

According to the storing box which has the construction in the above (3), the freedom in design increases for the position where the latching part is arranged.

According to the storing box which has the construction in the above (4), when the connectors are fitted in the electronic control unit, the electric wires and the connectors are easily held by hand, and the distance between the unit storing room and the connectors is the shortest one.

According to the storing box which has the construction in the above (5), the design modification to provide the latching part can be very small.

According to the storing box which has the construction in the above (6), the band can be prevented from being unintentionally untied from the latching part (even if the vibration is increased during transportation, it is difficult to untie the band.).

According to the electrical junction box which has the construction in the above (7), when the connectors are fitted in the electronic control unit, since the electric wires and the connectors can be easily held by hand, the workload of the operation is reduced, and since the distance between the unit storing room and the connectors is decreased, the workload is reduced. The freedom in design increases for the position where the latching part is arranged. When the connectors are fitted in the electronic control unit, the electric wires and the connectors can be easily held by hand, and the distance between the unit storing room and the connectors is the shortest one. The design modification to provide the latching part can be very small, and the band can be prevented from being unintentionally untied from the latching part.

According to the present invention, electric wires in a unit storing room and connectors at the ends of the electric wires can be easily held by hand above the opening part of the unit storing room, and the workload in the operation of connecting the plurality of connectors to the terminals of the electronic control unit respectively can be reduced. Therefore, the operation of setting the electronic control unit into the unit storing room can be performed smoothly and quickly.

The present invention has been briefly described above. Further, details of the invention will become more apparent after the embodiments of the invention described below are read with reference to the accompanying figures.

DETAILED DESCRIPTION OF THE EXEMPLARY EMBODIMENTS

The storing box and the electrical junction box according to one embodiment of the present invention are described as follows with reference to FIGS. 1 to 18. The storing box and the electrical junction box according to the embodiment include a storing box in which a unit storing room in which an electronic control unit is stored is formed, and are formed with a latching part by which electric wires and connectors connected to one ends of the electric wires which pass through the inner side of the unit storing room and are drawn out from a storing opening, which becomes the entrance when the electronic control unit is stored, are caught.

Figure 1:
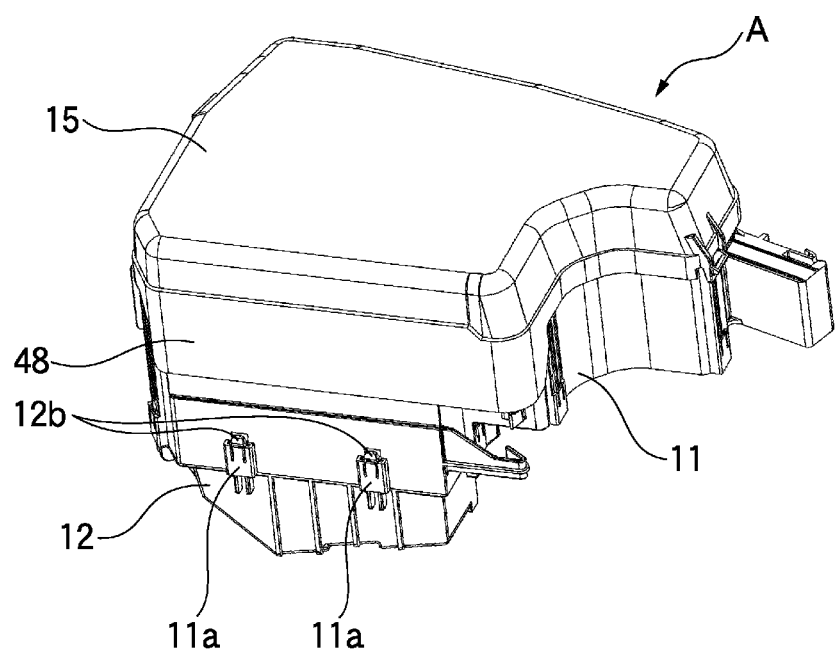
FIG. 1 is a perspective view of the electrical junction box (except a second lower member) according to an embodiment of the present invention.
Figure 2:
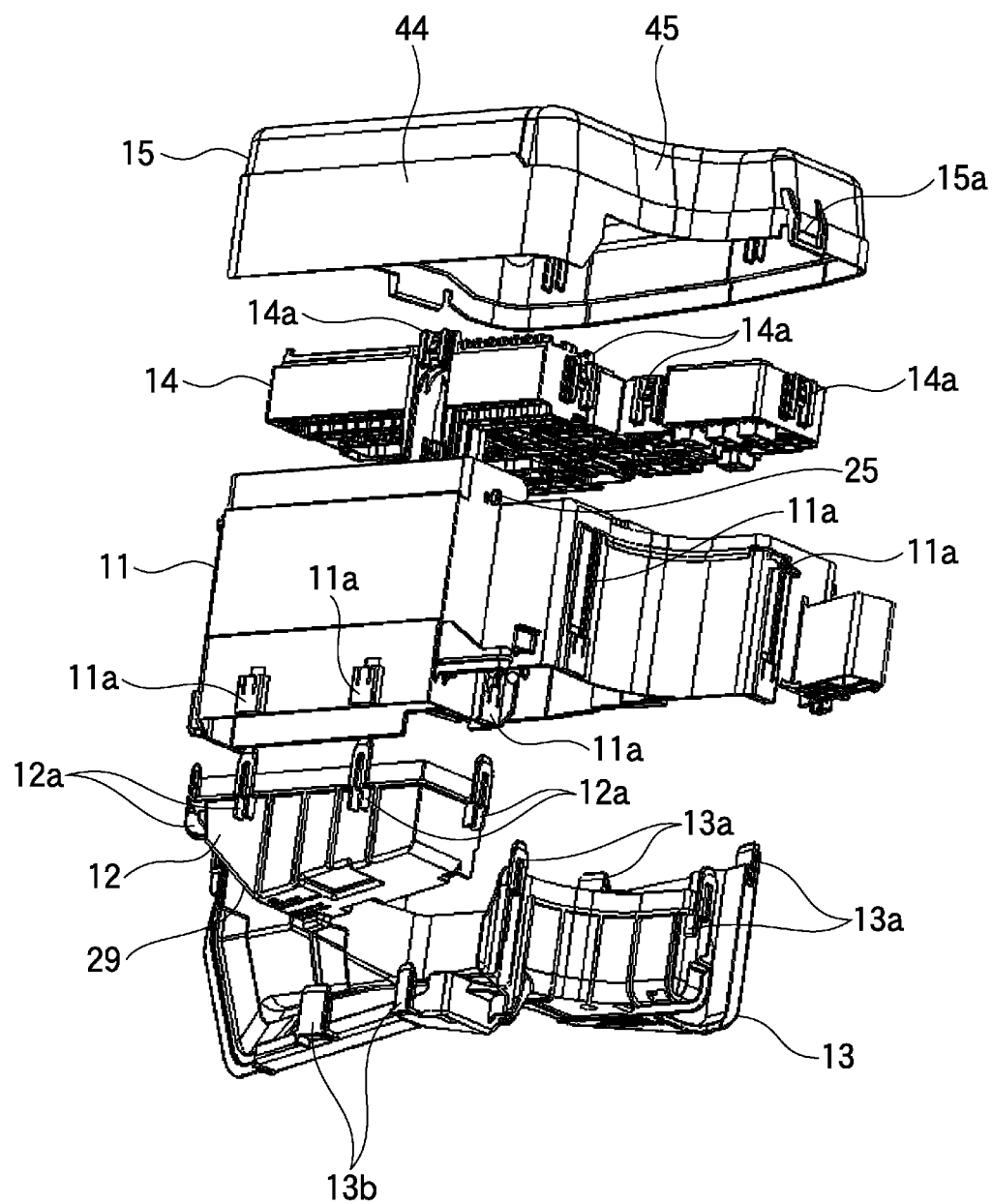
FIG. 2 is an exploded perspective view of the electrical junction box according to the embodiment of the present invention.
Figure 3:
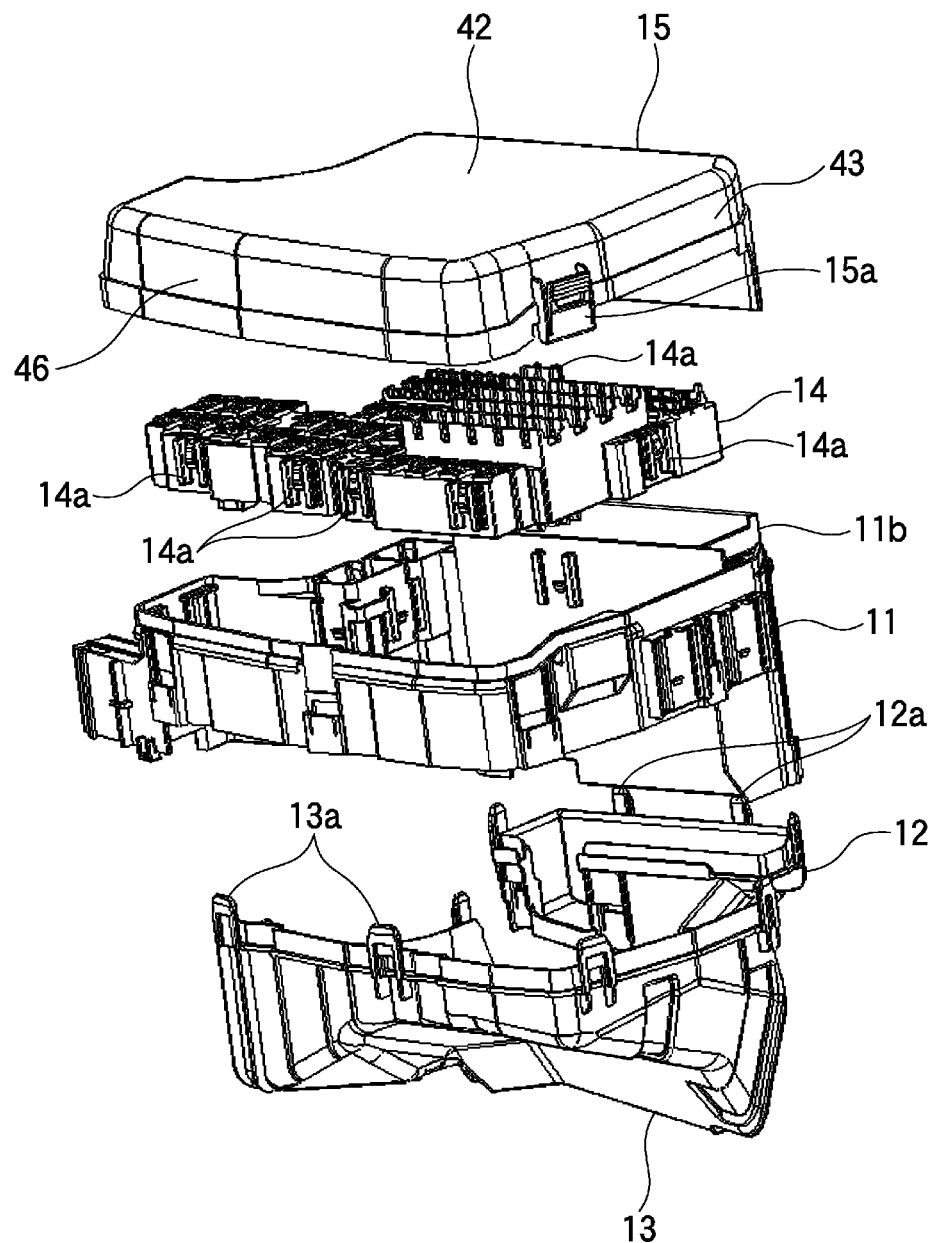
FIG. 3 is an exploded perspective view of the electrical junction box shown in FIG. 1 which is seen from a different direction.
Figure 4:
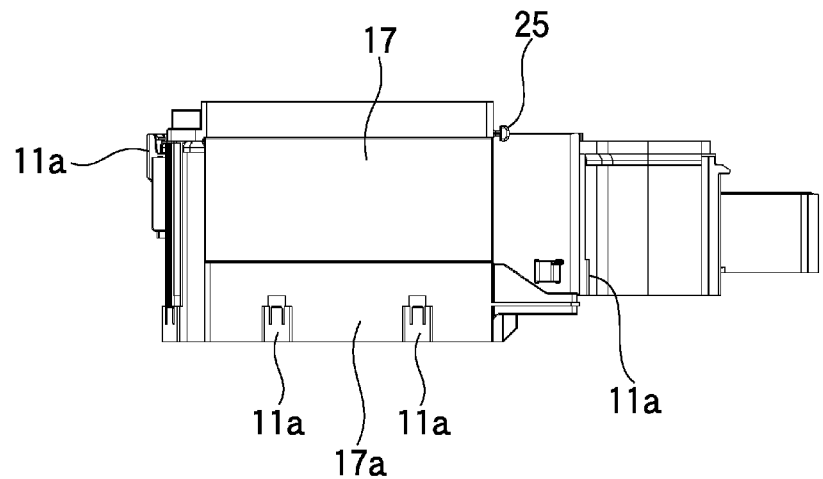
FIG. 4 is a front view of a frame of the electrical junction box according to the embodiment of the present invention.
Figure 5:
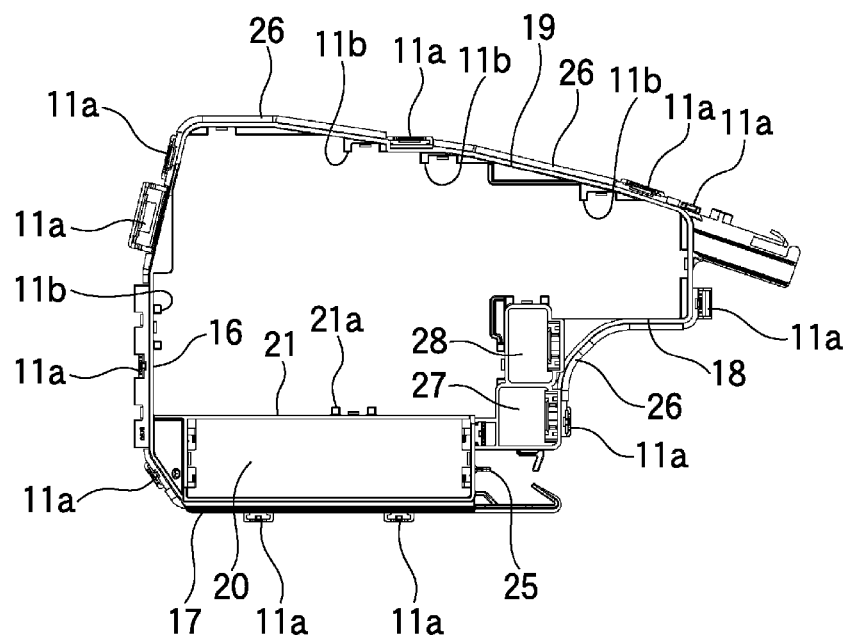
FIG. 5 is a top view of the frame of the electrical junction box according to the embodiment of the present invention.
Figure 6:
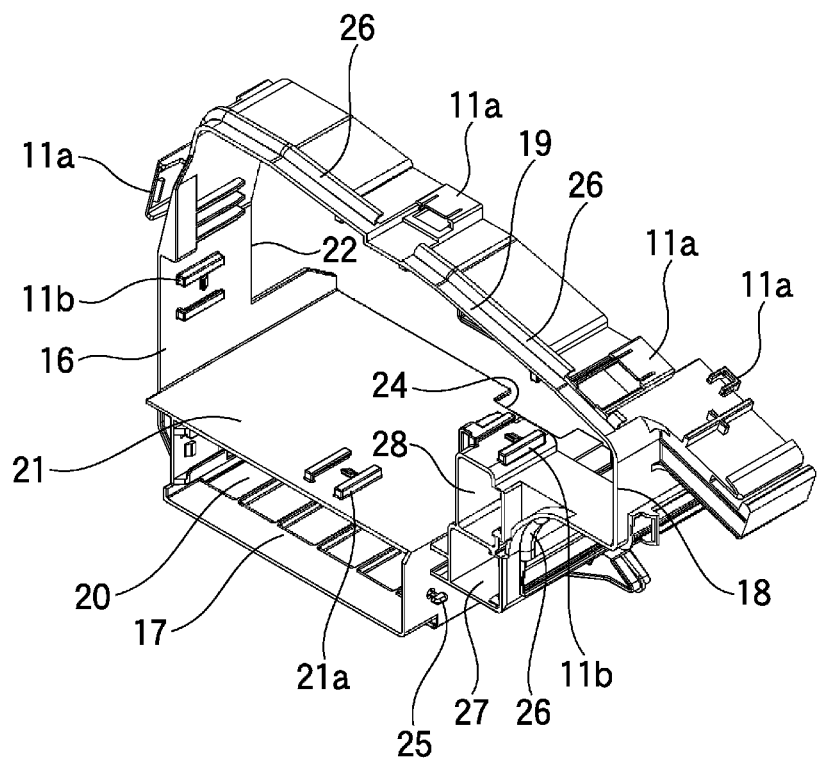
FIG. 6 is a perspective view of the frame of the electrical junction box according to the embodiment of the present invention which is seen obliquely from below.
Figure 7:
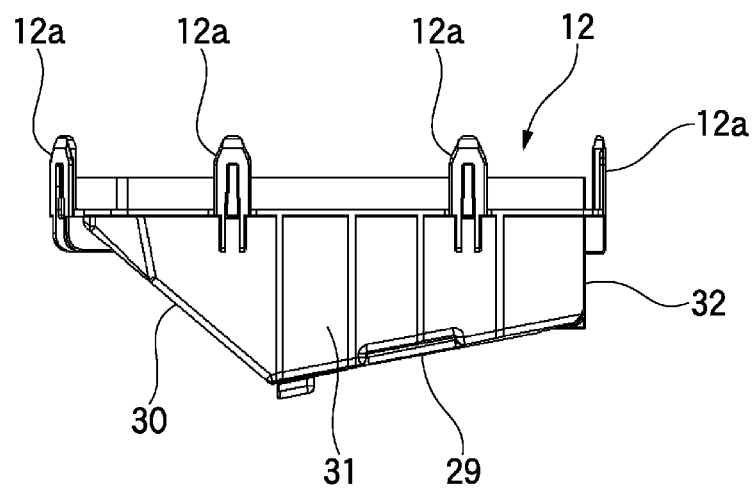
FIG. 7 is a front view of a first lower member of the electrical junction box according to the embodiment of the present invention.
Figure 8:
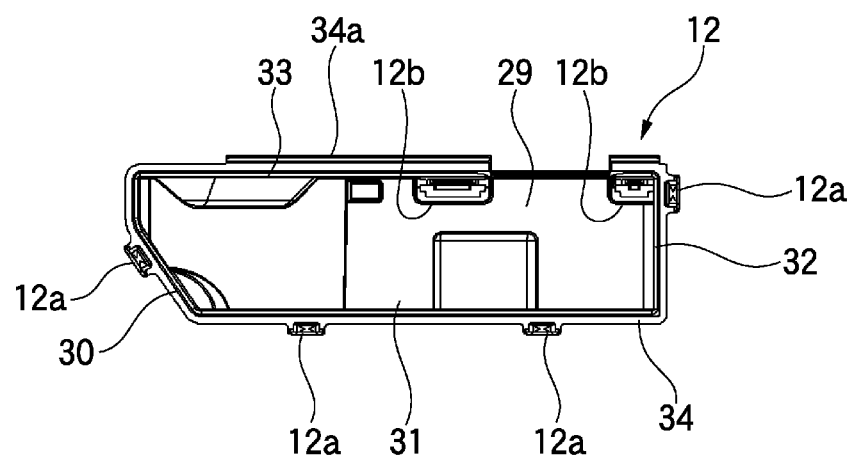
FIG. 8 is a top view of the first lower member of the electrical junction box according to the embodiment of the present invention.
Figure 9:
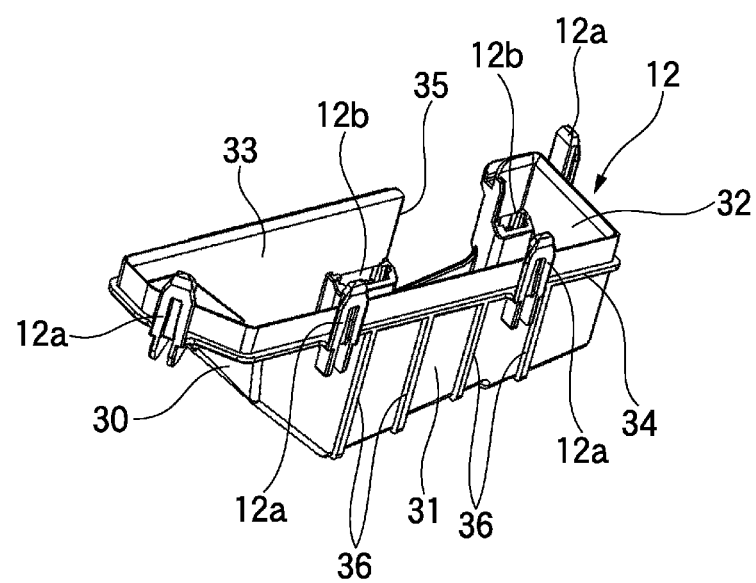
FIG. 9 is a perspective view of the first lower member of the electrical junction box according to the embodiment of the present invention.
Figure 10:
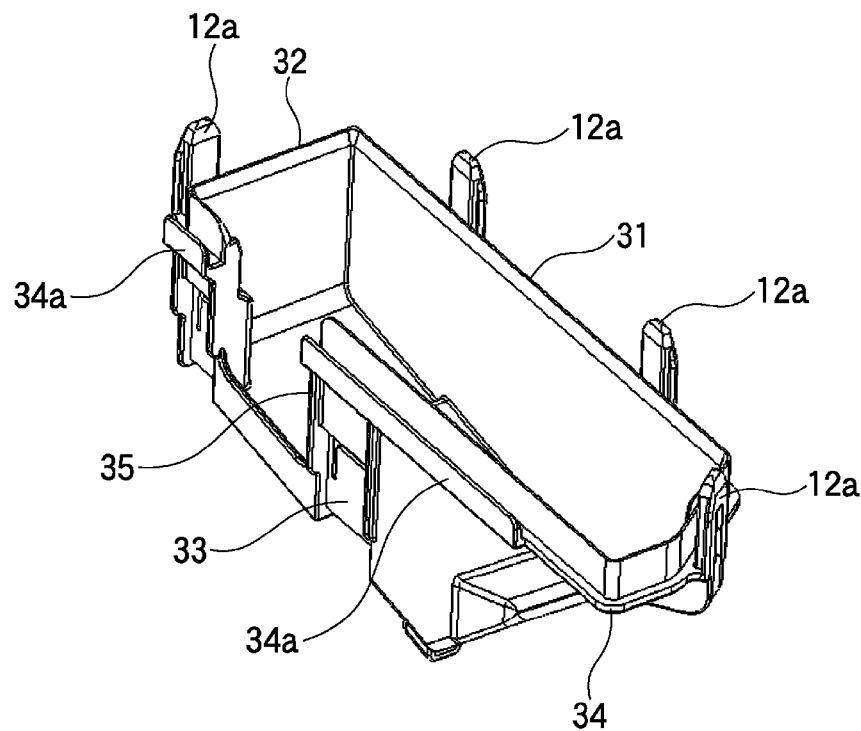
FIG. 10 is a perspective view of the first lower member shown in FIG. 7 which is seen from a different direction.

As shown in FIGS. 1 to 3, an electrical junction box A of the embodiment includes a frame 11 as a storing box, a first lower member 12, a second lower member 13, a base member 14 and an upper cover 15. The frame (storing box) 11, the first lower member 12, the second lower member 13, the base member 14 and the upper cover 15 are formed into predetermined shapes and sizes by using heat-resistant, insulative and tough material such as synthetic resin or in combination with metal materials. The electrical junction box A is formed when these members are integrally coupled by using coupling means (locking parts or locked parts) to be described below. As shown in FIGS. 4 to 6, among these members, the frame 11 is a circular body which is short in the up-down direction as a whole. The frame 11 has side walls 16, 17, 18 and 19, which make up the circular body, and the outer side surfaces of the side walls 16, 17, 18 and 19 are provided integrally with a plurality of locked parts 11a of the same size and shape. Each of the locked parts 11a may vary in size and shape.

The side walls 16 and 19 are curved outwards, the side wall 17 is flat, and the side wall 18 is curved into a substantially L shape as a whole. These side walls 16, 17, 18 and 19 are connected in a circle-shape. As shown in FIG. 4, when the side wall 17 and the opposed side wall 19 are compared in height, the side wall 17 is extended downward to be longer. Between the side wall 17 which includes an extended part 17a which is extended downward and the side wall 19, a separating wall 21 whose section is U-shaped (or whose section is a square) and which defines a unit storing room 20 is adjacently provided to the side wall 17. The separating wall 21 may be made of a metal plate which has a shielding function. A plurality of locking parts 11b of different sizes and shapes are provided integrally with and protruded from the inner side surfaces of the side walls 16, 18 and 19 which make up the circular body. Each of the locking parts 11b may have the same size and shape.

The locking parts 11b, which the inner side surfaces of the side walls 16 to 19 of the frame 11 are provided with, and a locking part 21a, which the outer side surface of the separating wall 21 is provided with, are locked to locking projections (locked parts) 14a, which the outer side surfaces of the base member 14 are provided with. Thereby, the base member 14 is held in the frame 11. The locked parts 11a, which the outer side surfaces of the side walls 16 to 19 of the frame 11 are provided with, are locked to locking projections 12a and 13a to be described below, which the first lower member 12 and the second lower member 13 are provided with, respectively. Thereby, the first lower member 12 and the second lower member 13 are held to the frame 11.

A cut 22 through which electric wires (harness) to be described below are led in is formed at the lower part of the side wall 16. Furthermore, a cut 24 through which connector-attached electric wires are led into the unit storing room 20 from within the frame 11 is formed at the lower part of the separating wall 21. A latching part 25 by which the connector-attached electric wires and the connectors are latched, as will be described below, is protruded from the corner part of the side wall 18.

Ribs 26, which support the lower edges of the upper cover 15 which blocks the upper opening of the frame 11, are provided integrally with and protruded from the outer side surfaces of the upper part of the side wall 18 and a part of the upper part of the side wall 19. Connector storing frames 27 and 28, in which the connectors connected to electric wires which are stored in the frame 11 are installed, are provided at the inner side of the side wall 18.

As shown in FIGS. 7 to 10, the first lower member 12 is a bottomed container which has such a shape that a bottom part 29 is concaved into a V-shape, and has a side wall 30, which is curved into a V-shape, that is, which has a part bended, and flat side walls 31 to 33. A rib 34 is protruded from the outer side surfaces of the side walls 30 to 33 at positions of the same distance from the upper ends of the side walls. The rib 34 functions to support the lower ends of the side walls 16 and 17 of the frame 11 whose lower part is attached to the first lower member 12. The locking projections 12a are integrally provided at predetermined positions on the side walls 30 to 32 along the rib 34. The locking projections 12a are provided at sites corresponding to those of the plurality of locked parts 11a on the frame 11. The locked parts 11a and the locking projections 12a are fitted to each other when the frame 11 and the first lower member 12 are coupled.

Figure 17A:
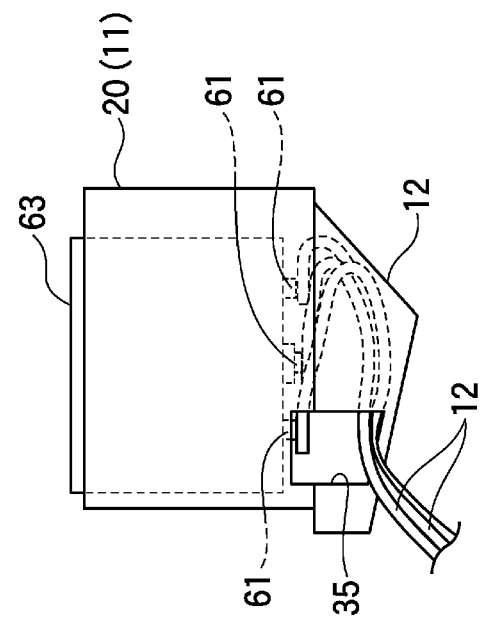
FIGS. 17A to 17C includes illustrative views which show the process of storing the electronic control unit that is extracted from and inserted into a unit storing room.
Figure 17B:
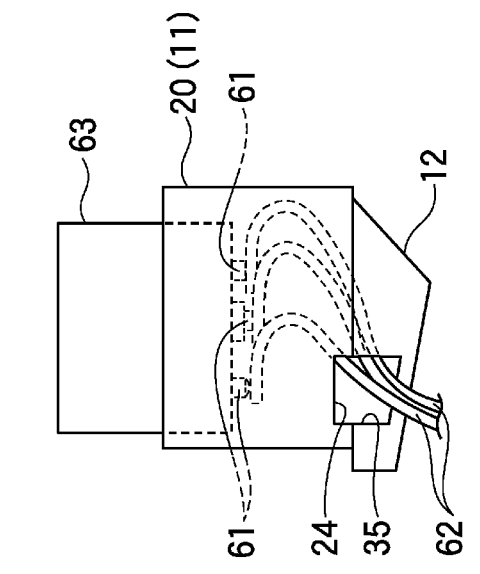
Figure 17C:
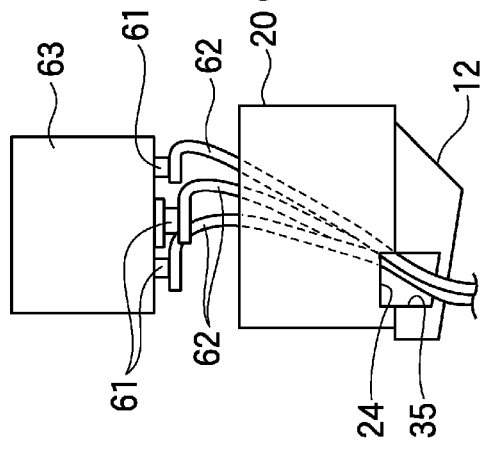

A cut 35 which has a slightly bigger opening is formed at the upper end of the side wall 33, and two (one is big and the other is small) locked parts 12b are provided integrally at the right and left sides of the cut 35. The cut 35 functions to guide the connector-attached electric wires (harness) which are led inside the first lower member 12 through the second lower member 13 which is provided adjacently to the first lower member 12 as shown in FIGS. 17A to 17C.

Figure 11:
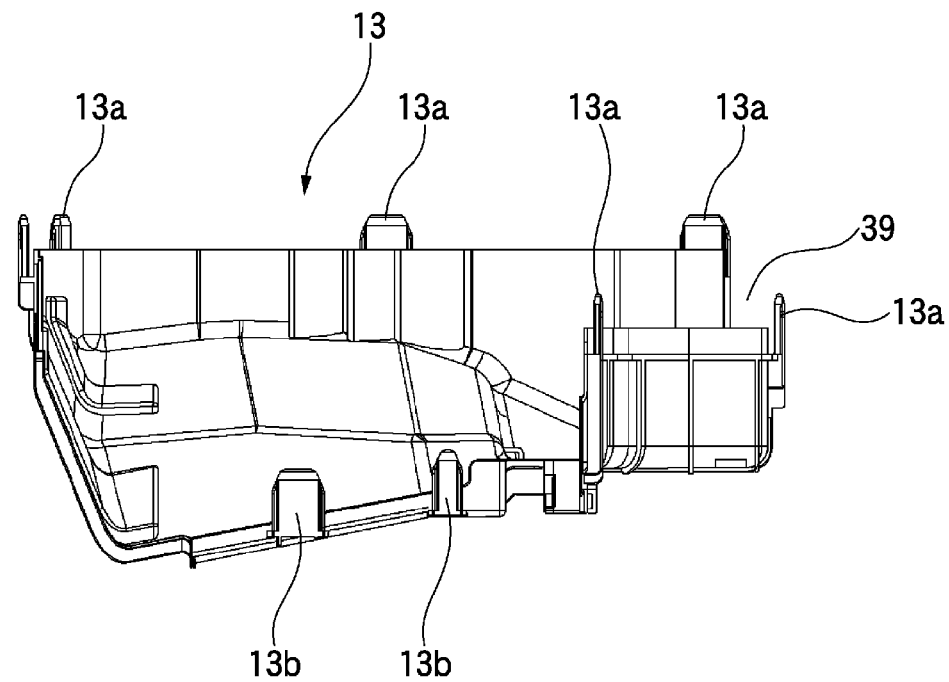
FIG. 11 is a front view of the second lower member of the electrical junction box according to the embodiment of the present invention.
Figure 12:
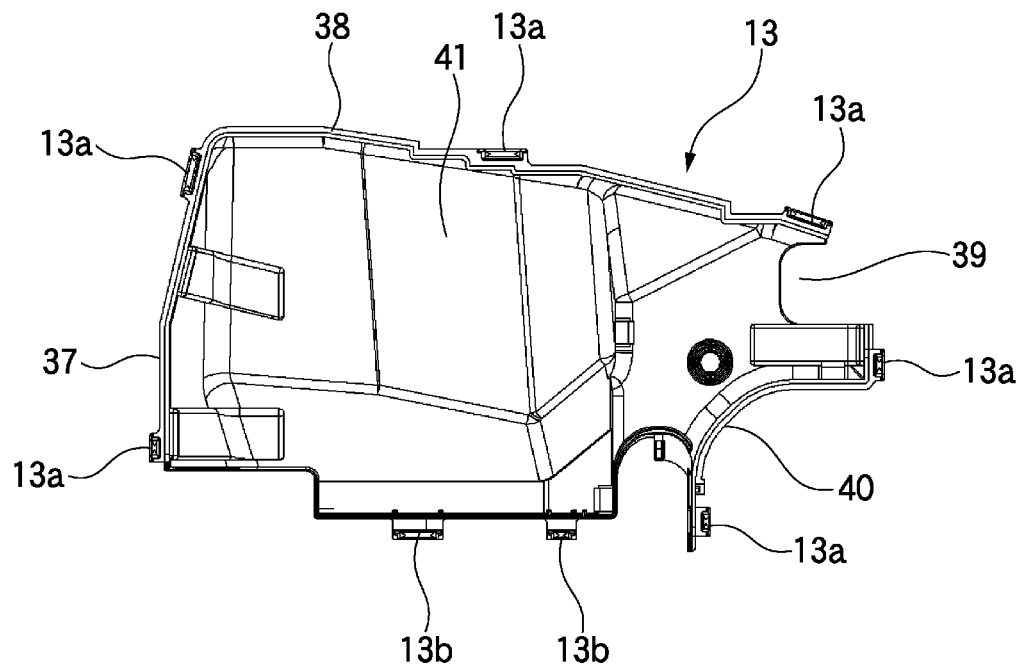
FIG. 12 is a top view of the second lower member of the electrical junction box according to the embodiment of the present invention.

The locked parts 12b are provided at sites corresponding to locking projections 13b which are protruded from the lower part of the lateral open end of the second lower member 13 as shown in FIGS. 11 and 12. When the first lower member 12 is connected to the second lower member 13, the locking projections 13b which are protruded from the second lower member 13 are fitted and connected to the locked parts 12b of the first lower member 12, respectively. The reference number 36 show a plurality of reinforcing ribs which are protruded from the outer side surface of the side wall 31 in the vertical direction so that the rib 34 is continued.

Raised pieces 34a are provided adjacently to the upper part of the outer side surface of the side wall 33 in the first lower member 12 to be raised up from the outer side edge of the rib 34. The raised pieces 34a function to give strength to resist the bending of the side wall 33 and to resist an external force accommodated from the separating wall 21 of the frame 11. Therefore, an operation of storing an electronic control unit to be described in the unit storing room 20 can be prevented from being hampered by the bending of the separating wall 21.

Thus, in the present embodiment, the lower member is divided in two parts: the first lower member 12 and the second lower member 13. The first lower member 12 communicates with the inside of the unit storing room 20 in the frame 11, and a space, which is shielded from the frame 11 except the unit storing room 20 and the second lower member 13, is formed. Thereby, the inside of the unit storing room 20 can be thermally shielded and separated from the outside, and the waterproofness and the strength can be improved. As a result, the stability and reliability of the electronic control unit stored in the unit storing room 20 can be secured. In this case, the lower edge of the separating wall 21 in the frame 11 is supported on the rib 34 between the side wall 33 of the first lower member 12 and the raised pieces 34a. Therefore, the separating wall 21 can be stably supported and can be prevented from being deformed in the horizontal direction.

FIGS. 11 and 12 show the second lower member 13 which has the locking projections 13b and locking projections 13a. The second lower member 13 is a bottomed container which is opened upwards and in the direction the first lower member 12 is coupled. The second lower member 13 has a side wall 37, a side wall 38, which is approximately L-shaped when viewed from top, an opening 39, an arc-shaped side wall 40 and a bottom part 41. The locking projections 13b may be locked to the locked parts 12b of the first lower member 12 which are arranged adjacently to the locking projections 13b, and the locking projections 13a may be locked to the locked parts 11a on the outer side surfaces of the frame 11. The side walls 37, 38, 40 and the bottom part 41 are reinforced by bending parts at a plurality of positions to each other.

The base member 14 is a board-like block in which electrical components mainly including a large number of connectors, fuses and relays are installed. The base member 14 has a plurality of locked parts 14a which the outer side surfaces of the block is integrally provided with. The base member 14 is made to have such a size and such a shape that the base member 14 may be stored in the frame 11 except the unit storing room 20. The locked parts 14a of the base member 14 may be fitted to the locking parts 11b at the inner side surfaces of the frame 11. The locked part 14a which is positioned at the front surface of the block may be locked to the locking part 21a of the separating wall 21.

Figure 13:
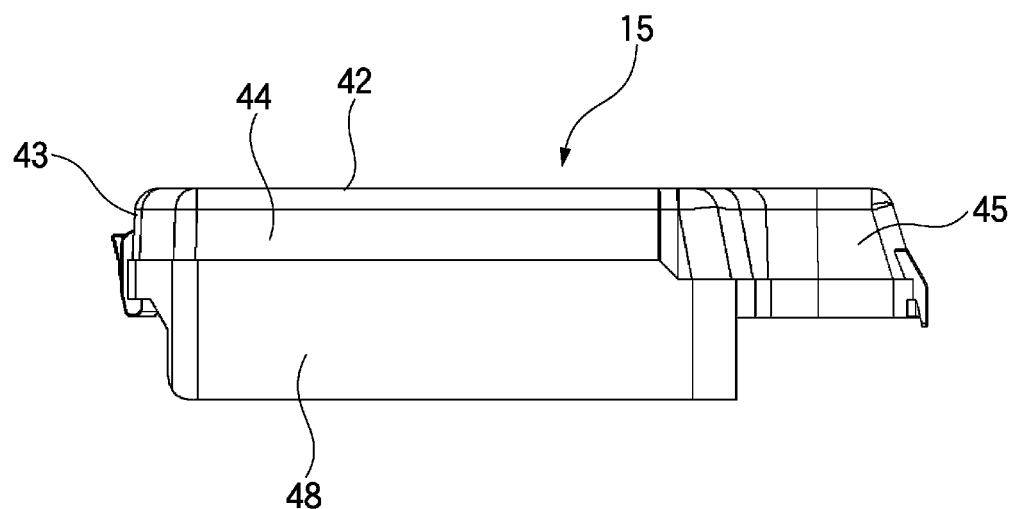
FIG. 13 is a front view of an upper cover of the electrical junction box according to the embodiment of the present invention.
Figure 14:
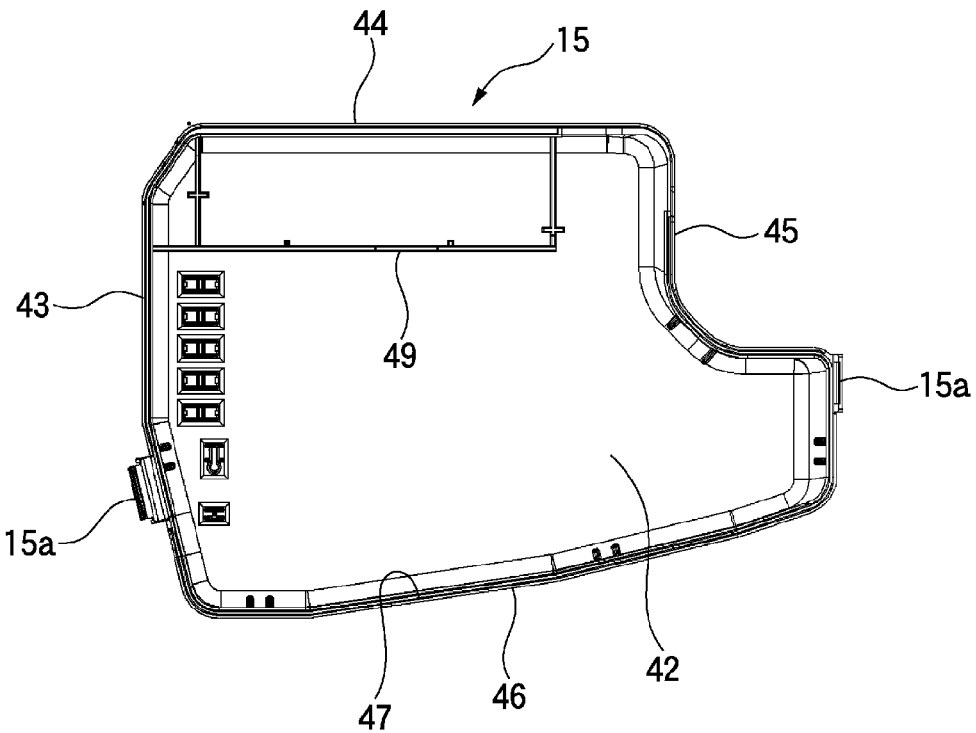
FIG. 14 is a bottom view of the upper cover of the electrical junction box according to the embodiment of the present invention.
Figure 15:
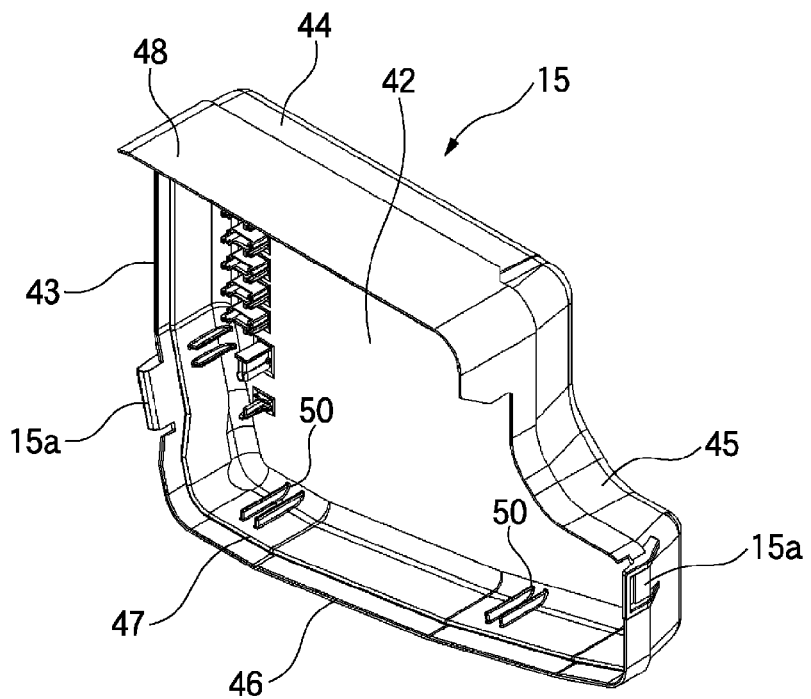
FIG. 15 is a perspective view of the upper cover of the electrical junction box according to the embodiment of the present invention which is seen obliquely from below.
Figure 16:
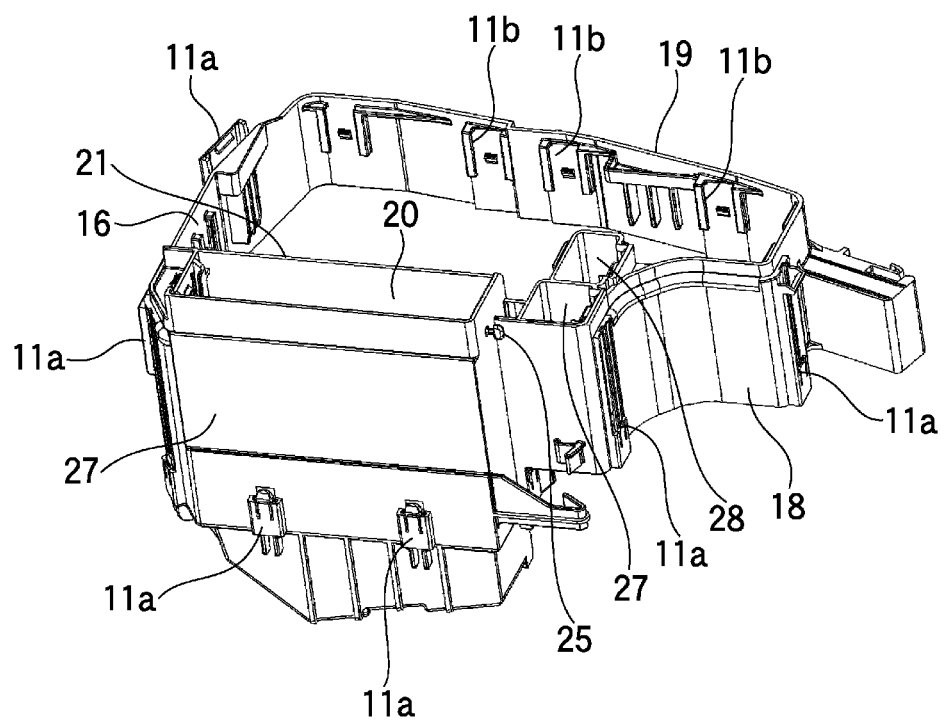
FIG. 16 is a perspective view which shows that the upper cover is removed from the electrical junction box shown in FIG. 1.

FIGS. 13 to 15 show the upper cover 15. The upper cover 15 is formed to cover the upper opening of the frame 11. The upper cover 15 includes a top part 42 and side walls 43 to 46 which are connected around the top part 42. Among these parts, the top part 42 and the side wall 44 are generally flatly formed. The side walls 43 to 46 are formed to have shapes and sizes generally corresponding to those of the side walls 16 to 19 of the frame 11 in a top view. The side wall 45 is substantially L-shaped as a whole in a top view and is connected with the side walls 43, 44, 46 to form a circle.

Parts of the side wall 43 and the side wall 45 are provided with locking projections 15a, one for each side wall, so that the parts of the side walls 43 and 45 are protruded outwards. The locking projections 15a are provided at positions corresponding to the positions of the locked parts 11a, which the side wall 16 and the side wall 18 of the frame 11 are provided with, one for each side wall. Therefore, when the upper part of the frame 11 is covered by the upper cover 15, the locking projections 15a may be engaged with the locked parts 11a.

A step part 47 is continuously formed on the inner side surfaces of the side walls 43 to 46 of the upper cover 15 at positions of the same distance from the top part 42. The upper edges of the side walls 16 to 19 of the frame 11 may be accommodated by the step part 47 at the inner side surfaces of the side walls 43 to 46. That is, the upper cover 15 is installed stably on the frame 11 when the step part 47 is supported by the upper edges of the side walls 16 to 19. An extended wall 48 is extended downward from the lower parts of the side wall 44 and the part of the side wall 45 that is connected to the side wall 44.

Furthermore, a separating wall 49 which is generally U-shaped and which defines a rectangular space with the side wall 44 is provided at the inner side surface of the upper cover 15. The separating wall 49 has a shape and a size, in a top view, that correspond to those of the separating wall 21 which the frame 11 is provided with. When the frame 11 is covered by the upper cover 15, the lower end edge of the separating wall 49 of the upper cover 15 is closely connected with the upper end edge of the separating wall 21 of the frame 11. Therefore, the separating wall 49 forms a space together with the top part 42 to seal the unit storing room 20 of the frame 11 from above. Thus, while the separating wall 49 thermally shields the inside of the unit storing room 20 from the outside, the separating wall 49 is bonded onto the separating wall 21 which forms the unit storing room 20. Thereby, the top part 42 is supported by the separating wall 49, and therefore the top part 42 can be prevented from being unintentionally bended (dented). Numbers 50 show a plurality of reinforcing ribs which the inner surfaces of the side walls 43 to 46 are provided with.

The frame 11, the first lower member 12, the second lower member 13, the base member 14 and the upper cover 15 of such structures are assembled as follows. First, the first lower member 12 is arranged below the frame 11, and the lower end edges of the side walls 16 and 17 and the separating wall 21 of the frame 11 are supported on the rib 34 of the first lower member 12. The locking projections 12a, which the outer side surfaces of the first lower member 12 are provided with, are inserted into the locked parts 11a at the lower part of the frame 11. At this time, the lower edge of the separating wall 21 is on the rib 34 and is located between the raised pieces 34a and the side wall 33. Therefore, a pressure force which is applied on the separating wall 21 from a large number of bundled electric wires to be described below in the frame 11 can be prevented from affecting the unit storing room 20. That is, the separating wall 21 can be prevented from being bended.

Then, while the opening part side of the second lower member 13 is made to face the side wall 33 side of the first lower member 12, the two (big and small) lock projections 13b at the opening part side are inserted into the locked parts 12b of the first lower member 12 from below. Before or after the engagement of the locking projections 13b with the locked parts 12b, the locking projections 13a at the outer side surfaces of the second lower member 13 are inserted into and locked to the locked parts 11a at the outer side surfaces of the frame 11, which are at opposed positions, from below. Thereby, the frame 11, the first lower member 12 and the second lower member 13 are connected.

Then, the base member 14 is inserted into the upper part of the frame 11 from above. At this time, the locking projections (locked parts) 14a, which the outer side surfaces of the base member 14 are provided with, are locked to the locking parts 11b, which the inner peripheral surfaces of the frame 11 are provided with. Thereby, the base member 14 is stably held at the upper part of the frame 11. The upper cover 15 is put on the frame 11 which stores the base member 14. A large number of electric wires which are connected to the relays and fuses installed in the base member 14 are arranged in the frame 11 under the base member 14. At this time, the locking projections 15a of the upper cover 15 are locked to the locked parts 11a at the outer peripheral surfaces of the frame 11 which are at positions corresponding to the lock projections 15a, one for each. Thereby, the upper cover 15 is installed to the frame 11 without a wobble. Finally, the electrical junction box A as shown in FIG. 1 is formed.

In this case, in the unit storing room 20 which is defined by the separating wall 21 in the frame 11, the lower part is blocked since a part of the lower end edges of the side walls 16 and 17 of the frame 11 and the lower end edge of the separating wall 21 are closely connected onto the rib 34 of the first lower member 12. The upper part is closed since a part of the lower end edges of the side walls 43 and 44 of the upper cover 15 and the lower edge of the separating wall 49 are closely connected to a part of the upper end edges of the side walls of the frame 11 and the upper end edge of the separating wall 21.

Therefore, the inside of the unit storing room 20 becomes a space which is thermally shielded from the inside and outside of the frame 11 except the unit storing room 20, and the thermal transfer between the unit storing room 20, which stores the electronic control unit, and the inside of the frame 11, which stores the connector-attached electric wires which are connected to the electronic control unit, is regulated.

In the electrical junction box A, the electric wires together with the base member 14 are stored in the frame 11 except the unit storing room 20. Ends of the electric wires and the connectors which are attached to the ends are inserted into the unit storing room 20 through the cut 35 of the first lower member 12 and the cut 24 which the separating wall 21 in the frame 11 is provided with. The connectors which are stored in the unit storing room 20 are fitted to the terminals of the electronic control unit prepared by the automobile manufacturer. Then, the electronic control unit is stored in the unit storing room.

The steps to store an electronic control unit 63 prepared by the automobile manufacturer in the unit storing room 20 of the frame 11 of the electrical junction box A are shown in FIGS. 17A to 17C. First, as shown in FIG. 17A, electric wires (harness) 62 attached with connectors 61 which are inserted inside the unit storing room 20 through the cut 24 and the cut 35 are lifted by fingers or a jig inserted from the side of the upper opening part of the unit storing room 20, and are installed (fitted) to the terminals (not shown in the figure) of the prepared electronic control unit 63.

Then, as shown in FIG. 17B, after the connectors 61 and the terminals at the side of the electronic control unit 63 are fitted surely, while the electric wires 62 are bended to a generally U shape in the first lower member 12 and the unit storing room 20, the electronic control unit 63 is pushed into the unit storing room 20. The pushing operation is performed until the top surface of the electronic control unit 63 is sunk near the opening part of the unit storing room 20. Then, the upper cover 15 is put on the frame 11 from above the large number of electric wires, which are arranged inside the frame 11 except the unit storing room 20, and the base member 14, which is arranged above the electric wires as described above.

Thereby, the electrical junction box A that can be carried in an automobile is formed. However, in the operation of connecting (fitting) the connectors 61 to the terminals of the electronic control unit 63, for example, it is necessary that one hand supports the electronic control unit 63, and the other hand strongly grasps the connectors 61 at the ends of the electric wires 62 onto which a force to draw the electric wires 62 back into the unit storing room 20 is applied due to gravity. The connecting operation is troublesome.

When the electronic control unit is held as describe above, the hand which supports the electronic control unit 63 is free, or this hand only slightly holds the electronic control unit so that the electric wires 62 and the connectors 61 near the bottom part of the unit storing room 20 can be lifted to the opening part of the unit storing room 20 and easily fitted to the terminals of the electronic control unit 63. After the operation of connecting all electric wires to the electronic control unit 63 is finished, as shown in FIG. 17C, the electronic control unit 63 is stored in the unit storing room 20 while the side of the terminals, which the connectors are connected to, faces downward. Thereby, the operation of storing the electronic control unit 63 into the unit storing room is performed by the automobile manufacturer efficiently.

The connectors 61 and the electric wires 62, just before being connected to the terminals of the electronic control unit 63, are positioned near the bottom part of the unit storing room 20 due to gravity. Therefore, when the connectors 61 are connected to the terminals of the electronic control unit 63, it is necessary to pick up all connectors 61 near the bottom of the unit storing room 20 from the inside of the unit storing room 20 and keep lifting the connectors 61 above the opening part of the unit storing room 20. Otherwise, when one connector 61 is connected to the terminals of the electronic control unit 63, other connectors which are lifted with the connector 61 described above will drop to the bottom of the unit storing room 20 due to gravity. In this case, when the dropped connectors 61 are to be connected to the terminals, the connectors 61 sunk in the unit storing room 20, together with the attached electric wires must be picked up and lifted again. It is extremely troublesome to repeat the operation.

Figure 18:
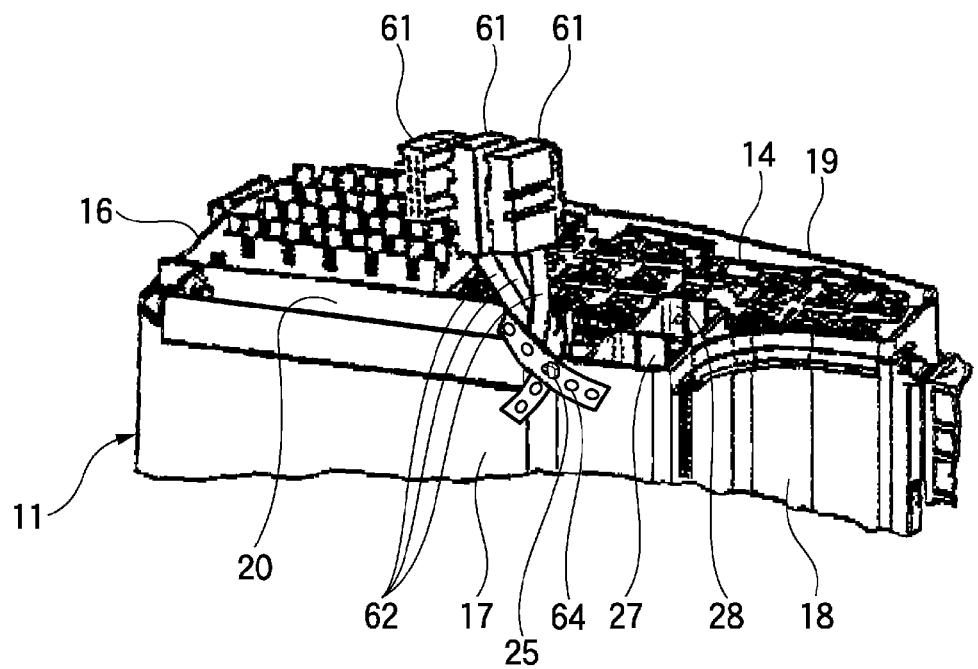
FIG. 18 is a perspective view which shows that connector-attached electric wires which are lifted up from the unit storing room are temporarily locked by a latching part of the frame.

Thus, in this embodiment, once the plurality of electric wires 62 attached with the connectors 61 are lifted from inside the unit storing room 20, the plurality of electric wires 62 are bundled by a band 64, and the band 64 is locked by a latching pin (projection) 25 which is a latching part. FIG. 18 shows that the latching pin 25 as the latching part is protruded from the outer side surface of the side wall 18 of the frame 11. The latching pin 25 is protruded from and provided integrally with the surface of the side wall 18 by using the same material as the frame 11 when the frame 11 is formed. Alternatively, the latching pin 25 is provided by embedding only the base of a short metal rod such as a stainless steel rod in the side wall 18. Alternatively, the latching pin 25 is provided by making a screw shaft, which is screwed into the side wall 18 from the inner side of the side wall 18, to be protruded outwards. The band 64 is made of elastic rubber. After the plurality of electric wires 62 are bundled near the head parts of the connectors 61, the band 64 is caught by the latching pin 25. The band 64 is provided with a plurality of circular holes (or rectangular slits, cuts) along the longitudinal direction at predetermined intervals. After the plurality of electric wires 62 are bundled, the latching pin penetrates two opposed holes at the intersection position of the band 64 so that the band 64 is caught by the latching pin 25. When the electronic control unit 63 is stored in the unit storing room 20, required electric wires 62 are separated by loosening the band 64, and the connectors 61 of the separated electric wires 62 are connected with the terminals which are exposed to the bottom surface of the electronic control unit 63 while the remaining electric wires 62 are bundled by the band 64 and caught by the latching pin 25. Thereby, the operation of connecting the connectors 61 to the terminals can be performed easily and quickly. As a result, the operation of connecting a plurality of connectors 61 to the terminals of the electronic control unit 63 can be efficiently performed by the automobile manufacturer or the like. A versatile connecting band such as a rubber band, a hook and loop fastener which is called a magic tape (registered trademark) or a resin tie band can be used as the band 64.

In the above description, the latching pin 25 as the latching part is provided at the upper part of the side wall 18 close to the storing opening, but the latching pin 25 may be provided at any site on the outer side surface of the side wall 18, and also may be provided at a part on the outer side surfaces of the side walls 16 and 17.

With reference to FIG. 18, it is described that the band 64 is locked to the latching pin 25 which the side wall 18 of the frame 11 is provided with, and the electric wires 62 are held near the opening part of the unit storing room 20. However, the electric wires 62 also can be held near the opening part of the unit storing room 20 like above if the band 64 is locked to a latching part which the outer side surface of the side wall 17 or a member which surrounds the unit storing room 20 is provided with. For example, a part of the band 64 by which the plurality of electric wires 62 are bundled is locked to a projection or a hook part as the latching part which is provided on the outer side surface of the side wall 44 of the upper cover 15 which is put on the frame 11 so that the unit storing room 20 is enclosed. A detailed example of the frame 11 which is formed with a latching part is described as follows.

Figure 19:
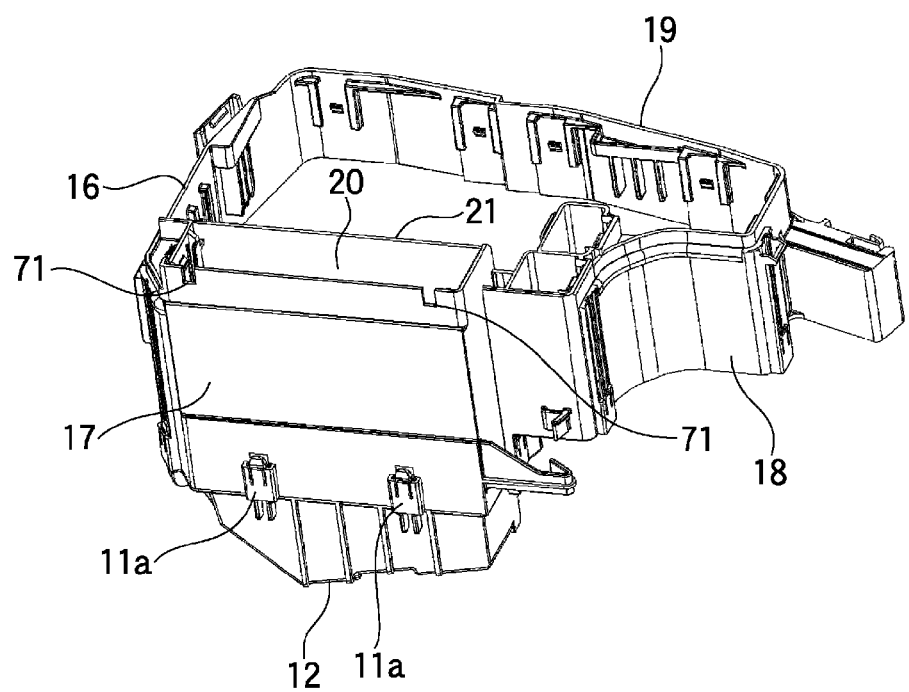
FIG. 19 is a perspective view which shows a second embodiment of the latching part provided on the frame.

FIG. 19 shows that grooves 71 as the latching part are drilled at the outer side surface of the side wall 17 of the frame 11. The grooves 71 are grooves which are formed by drilling parts of the side wall 17 in the direction the electronic control unit 63 is stored in the unit storing room 20.

In this case, the plurality of electric wires 62 attached with the connectors 61 which are lifted from within the unit storing room 20 are bundled by the band 64 as described above, and a part of the band 64 is caught in the grooves 71 at the outer side surface of the side wall 17. When the connectors 61 are connected to the corresponding terminals of the electronic control unit 63, either of the electric wires 62 is separated from others by temporarily loosening the band 64. The connector 61 at the end of the separated electric wire 62 is connected to the corresponding terminal of the electronic control unit 63.

The other electric wires 62 except the separated electric wires 62 are bundled by the band 64 and locked to the grooves 71. Therefore, the connectors 61 at the ends of these electric wires 62 are above the opening part of the unit storing room 20, and will not be drawn back into the unit storing room 20. Accordingly, the operator unties the band 64 temporarily again, separates another electric wire 62 from the other electric wires 62 adjacent to each other and connects the connector 61 at the end of the electric wire 62 to another corresponding terminal on the lower surface of the electronic control unit 63. In this case, other electric wires 62 except the separated electric wire 62 are bundled and tied by the band 64 and locked to the groove 71. Therefore, the connectors 61 at the ends of these electric wires 62 are above the opening part of the unit storing room 20, and will not be drawn back into the unit storing room 20.

In this way, all connectors 61 of the electric wires 62, which are bundled by the band 64 which is locked to the groove 71, can be sequentially connected (fitted) to the terminals of the electronic control unit 63, respectively. In this case, when the connectors 61 of the electric wires 62 are connected to the terminals of the electronic control unit 63 respectively, there are no traditional troublesome operation that the electric wires 62 which are lifted up from inside the unit storing room 20 are supported by one hand in order not to be drawn back into the unit storing room 20 again. Therefore, the operation of connecting the connectors 61 to the terminals of the electronic control unit 63 respectively is efficiently performed.

Figure 20:
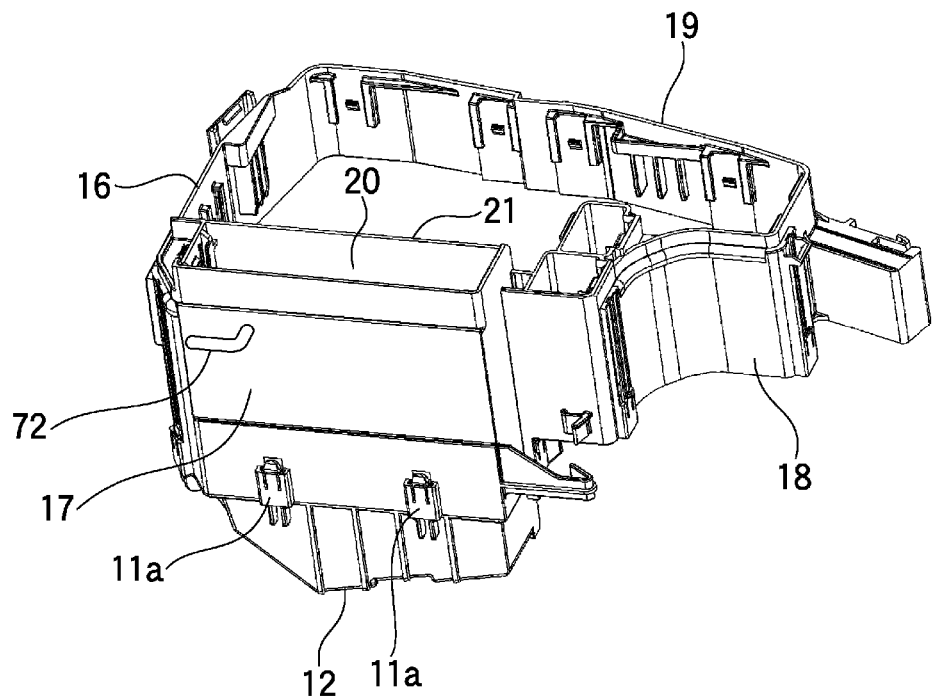
FIG. 20 is a perspective view which shows a third embodiment of the latching part provided on the frame.

FIG. 20 shows that the outer side surface of the side wall 17 of the frame 11 is provided with a substantially L-shaped hook pin 72 as the latching part. A part of the band 64 by which the plurality of electric wires are bundled is caught by the hook pin 72. Thereby, while it is difficult for the band 64 to fall off from the hooked pin 72, the band 64 can be held stably onto the hook pin 72. The hook pin 72 is protruded from and provided integrally with the surface of the side wall 17 by using the same material as the frame 11, and is provided, for example, by embedding only the base of a short metal rod such as a stainless steel rod in the side wall 17, or by making a screw shaft which is screwed into the side wall 17 from the inner side of the side wall 17 to be protruded outwards, and bending the distal end.

In this case, the plurality of electric wires 62 attached with the connectors 61 which are lifted from within the unit storing room 20 are bundled by the band 64 as described above, and while a part of the band 64 is caught by the hook pin 72 at the outer side surface of the side wall 17, the band 64 can be locked and held from the distal end part of the hook pin 72 through the curved part to a position near the base part. Thereby, the band 64 will not easily fall off through the L-shaped curved part even if the band 64 accommodates a small external force. In this case, the curved direction of the curved part of the hook pin 72 is appropriately decided in consideration of making it difficult for the band 64 to fall off. The operation of connecting the connectors 61 to the terminals of the electronic control unit 63 is performed on each connector 61 similarly to the case of using the straight latching pin 25 described above.

Figure 21:
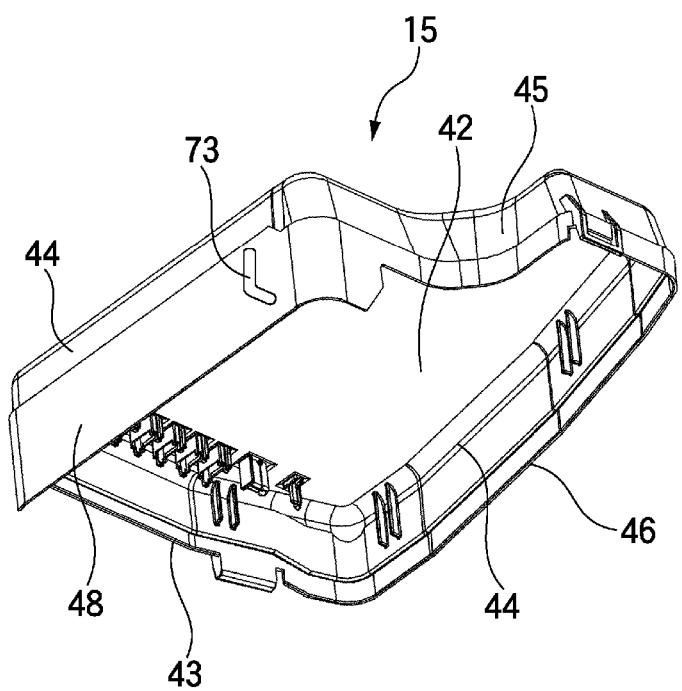
FIG. 21 is a perspective view which shows an embodiment of the locking part provided at the upper cover.

FIG. 21 shows that the upper cover 15 is provided with an L-shaped hook pin (projection) 73 as the latching part. As described above, the upper cover 15 is put on the frame 11 so that the unit storing room 20 is enclosed, and the upper cover 15 is once removed from the upper part of the frame 11 when the electronic control unit 63 is stored in the unit storing room 20. The removed upper cover 15 is arranged to lean to a site except those near the opening part of the unit storing room 20 on the frame 11.

Thus, a part of the band 64 by which the plurality of electric wires 62 are bundled is caught by the hook pin 73. The hook pin 73 is protruded from and provided integrally with the surface of the side wall 44 by using the same material as the frame 11, and is provided, for example, by embedding only the base of a short metal rod such as a stainless steel rod in the side wall 44, or by making a screw shaft which is screwed into the side wall 44 from the inner side of the side wall 44 to be screwed into the hook pin 73.

In this case, the plurality of electric wires 62 attached with the connectors 61 which are lifted from within the unit storing room 20 are bundled by the band 64 as described above, and a part of the band 64 is caught by the hook pin 73 on the side wall 44. The band 64 is guided from the distal end part of the hook pin 73 through the curved part to a position near the base part, and is locked and held. Thereby, the band 64 will not easily fall off from the hook pin 73 which is curved into an L shape even if a small external force is applied. The operation of connecting the connectors 61 to the terminals of the electronic control unit 63 is performed similarly to the case of using the grooves 71 or the hook pin 72 described above.

In the present embodiment, the lower member is divided in two parts: the first lower member 12 and the second lower member 13. The first lower member 12 communicates with the inside of the unit storing room 20 in the frame 11, and a space, which is shielded from the frame 11 except the unit storing room 20 and the second lower member 13, is formed. Therefore, the inside of the unit storing room 20 can be thermally shielded and separated from the outside, and the waterproofness and the strength of the lower member can be improved surely. As a result, the stability and reliability of the electronic control unit stored in the unit storing room 20 can be secured. When the first lower member 12 is installed to the frame 11, the lower edge of the separating wall 21 in the frame 11 is supported on the rib 34 between the side wall 33 of the first lower member 12 and the raised pieces 34a. Therefore, there are merits that the separating wall 21 can be stably supported and can be regulated from being deformed in the horizontal direction.

Furthermore, the step part 47 is formed to a circle shape on the inner side surfaces of the side walls 43 to 46 of the upper cover 15 at the sites of the same distance from the top part 42, and the step part 47 is formed to be supported by the upper edges of the side walls 16 to 19 of the frame 11. Therefore, the upper cover 15 is stably installed to the frame 11 while a part of the upper cover 15 overlaps the frame 11 in the horizontal direction.

In addition, the upper cover 15 is formed with the separating wall 49 which is substantially U-shaped and which defines a rectangular space with the side wall 44. Therefore, when the frame 11 is covered by the upper cover 15, the lower end edge of the separating wall 49 is closely connected with the upper end edge of the separating wall 21 at the side of the frame 11 so that the separating wall 49 forms a space together with the top part 42 to seal the unit storing room 20 of the frame 11 from above. As a result, while the inside of the unit storing room 20 can be thermally shielded from the outside, the separating wall 49 reinforces the top part 42 so that the top part 42 can be avoided from being unintentionally bended (dented).

As described above, in this embodiment, since the electrical junction box (storing box) A which has the unit storing room 20 in which the electronic control unit 63 is stored includes the latching part 25 by which the electric wires 62 and the connectors 61 connected to one ends of the electric wires 62 which pass through the inner side of the unit storing room 63 and are drawn out from the storing opening, which becomes the entrance when the electronic control unit 63 is stored, are caught, when the connectors 61 are embedded into the terminals of the electronic control unit 63, the electric wires 62 and the connectors 61 can be easily held by hand. Thus, the workload when the above embedding is performed and the electronic control unit 63 is set into the unit storing room 20 is reduced.

In this case, since the latching part 25 is formed at the side wall 17 which defines the unit storing room 20 so that the distance between the unit storing room 20 and the connectors 61 is decreased, the workload is reduced. Since the latching part 25 is formed on the peripheral member which surrounds the unit storing room 20, the freedom in design increases for the position where the latching part 25 is arranged. Since the latching part 25 is formed on the outer side surface of the side wall 17 which defines the unit storing room 20, when the connectors 61 are fitted into the terminals of the electronic control unit 63, the electric wires 62 and the connectors 61 are easily held by hand, and the distance between the unit storing room 20 and the connectors 61 is the shortest one. Furthermore, since the latching part is a projection such as the latching pin 25 which is protruded outwards from the side wall 17 which defines the unit storing room 20, the design modification to provide the latching part 25 can be very small. Furthermore, since part of the band 64 by which the electric wires 62 are bundled is caught by the latching pin (projection) 25, the band 64 can be prevented from being unintentionally untied from the latching part.

Although the invention is described in detail with reference to specific embodiments, it is apparent that various modifications and amendments may be made by those skilled in the art without departing from the spirit and scope of the invention.

The present invention is useful in the fields of a storing box and an electrical junction box which are carried in an automobile or the like and include a unit storing room to store an electronic control unit.

What is claimed is:

1. A storing box formed with a unit storing room storing an electronic control unit, comprising:
    a protrusion forming a latching part and arranged on the storing box;
    a band bundling at least one electric wire, the at least one electric wire passing through an inner side of the unit storing room and being drawn out from a storing opening which is an entrance for storing the electronic control unit; and
    a plurality of apertures formed in at least a portion of the band, at least one aperture of the plurality of apertures extending over the protrusion forming the latching part to maintain a position of the at least one electric wire.

2. The storing box according to claim 1, wherein
    the latching part is formed at a side wall which defines the unit storing room.

3. The storing box according to claim 1, wherein
    the latching part is formed at a peripheral member which surrounds the unit storing room.

4. The storing box according to claim 2, wherein
    the latching part is formed on an outer side surface of the side wall which defines the unit storing room.

5. The storing box according to claim 4, wherein
    the latching part protrudes outward from the side wall which defines the unit storing room.

6. An electrical junction box comprising the storing box according to claim 1.

7. The storing box of claim 1, the band further including a first end and an opposite second end, and wherein the band bundling the at least one electrical wire further includes the band extending around the at least one electrical wire such that at least a portion of the first end and at least a portion of the second end overlap.

8. The storing box of claim 7, further including a first aperture arranged proximal the first end being aligned with a second aperture arranged proximal the second end when the at least a portion of the first end and the at least a portion of the second end overlap, the first aperture and the second aperture extending over the protrusion forming the latching part to maintain a position of the at least one electric wire.

* * * * *